United States Patent [19]
Matsumoto

[11] Patent Number: 5,430,695
[45] Date of Patent: Jul. 4, 1995

[54] MAGNETO-OPTICAL DISK HAVING A MAGNETIC FILM WITH TWO LAYERS AND A PLAYBACK METHOD THEREOF

[75] Inventor: Hiroyuki Matsumoto, Tokyo, Japan

[73] Assignee: Nikon Corporation, Tokyo, Japan

[21] Appl. No.: 197,196

[22] Filed: Feb. 16, 1994

[30] Foreign Application Priority Data

Feb. 16, 1993 [JP] Japan .................. 5-025902

[51] Int. Cl.$^6$ ............................................. G11B 13/04
[52] U.S. Cl. .................................. 369/13; 360/114; 360/59
[58] Field of Search .................. 369/13, 275.2, 116, 369/121, 122, 124, 54, 59, 14; 360/59, 114; 365/122, 10, 32

[56] References Cited

U.S. PATENT DOCUMENTS

| | | | |
|---|---|---|---|
| 5,018,119 | 5/1991 | Aratani et al. | 369/13 |
| 5,163,031 | 11/1992 | Osato | 369/13 |
| 5,235,569 | 8/1993 | Matsumoto et al. | 369/13 |
| 5,239,524 | 8/1993 | Sato et al. | 369/13 |
| 5,355,354 | 10/1994 | Matsumoto et al. | 369/13 |

FOREIGN PATENT DOCUMENTS

| | | |
|---|---|---|
| 0258978A2 | 3/1988 | European Pat. Off. . |
| 0282356A2 | 9/1988 | European Pat. Off. . |
| 0330394A2 | 8/1989 | European Pat. Off. . |
| 0364196A2 | 4/1990 | European Pat. Off. . |
| 0462843A2 | 12/1991 | European Pat. Off. . |
| 0465859A2 | 1/1992 | European Pat. Off. . |
| 0492533A2 | 7/1992 | European Pat. Off. . |
| 3936690A1 | 5/1990 | Germany . |
| 02158938 | 12/1988 | Japan . |
| 2234623 | 2/1991 | United Kingdom . |

*Primary Examiner*—Georgia Y. Epps
*Assistant Examiner*—Ali Neyzari
*Attorney, Agent, or Firm*—Staas & Halsey

[57] ABSTRACT

A magneto-optical disk having at least two magnetic layers stacked on a substrate. The magnetism of both of these magnetic layers exchange coupled at temperatures below the curie points of both layers, where primary micro-regions $\alpha_0$ are provided in which the magnetic wall produced between the magnetic layers is canceled by the magnetic inversion of the primary magnetic layer, and secondary micro-regions $\alpha_1$ are provided in which the magnetic wall produced between the magnetic layers is canceled by the magnetic inversion of the secondary magnetic layer. One of the micro-regions is considered the informational unit, and the presence/absence and/or length of this informational unit expresses the information stored on the disk. As a result, there is no problem of information being lost when the disk is accidentally exposed to an excessive magnetic field or when the disk is exposed to abnormally high temperatures.

6 Claims, 6 Drawing Sheets

MAGNETO-OPTICAL DISK HAVING A MAGNETIC FILM WITH TWO LAYERS AND A PLAYBACK METHOD THEREOF

BACKGROUND OF THE INVENTION

1. Field of the Invention

The present invention relates to recording media and, in particular, to a new magneto-optical disk and the method of playback thereof.

2. Description of the Related Art

Recently, great efforts have been made to develop an optical recording and playback method, as well as recording equipment, playback equipment and recording media to be used according to such a method, wherein a variety of demands will be satisfied, including high density and large volume storage, high access speeds, and high recording and playback speeds.

Among the wide range of optical recording and playback methods presently contemplated, the magneto-optical recording and playback method holds the greatest promise because of the unique advantage that, after being recorded on the recording medium, information can be erased, and it is possible to repeatedly record new information on the recording medium many times over.

The magneto-optical recording disk (medium) used in this magneto-optical recording and playback method has a magnetic film comprising one or multiple layers to be the layer that preserves the recording. Originally, when magneto-optical disks were first produced, the magnetic film was a horizontally magnetized film (the direction of magnetization ran parallel to the film plane). Later, perpendicularly magnetized layers, which have high recording densities and high signal strength, were developed. Today, this latter type of magneto-optical recording disk, having perpendicularly magnetized layers, is used most of the time and the magnetized film is composed of, for example, amorphous GdFe and GdCo, GdFeCo, TbFe, TbCo, or TbFeCo, etc. In general, the magneto-optical recording disk has concentric circular or linear tracks, and information is recorded on these tracks.

For a description of the related art herein, a first direction of magnetization (the "upward" direction) in relation to the film plane shall be defined as the "A direction," and a second direction of magnetization, opposite to the first direction of magnetization, shall be defined as the "anti-A direction." The information to be recorded on the magneto-optical disk has previously been made into binary information, and is recorded by two signals, the first being a mark which is magnetized in the "A direction" and designated $B_1$, and the second being a mark that has been magnetized in the "anti-A direction" and designated $B_0$. These two marks $B_1$ and $B_0$ are equivalent to the digital signals of 1 for one direction and 0 for the other, respectively. However, the magnetizing of the recording track is generally uniform in the "anti-A direction" by applying a powerful external magnetic field prior to recording. This act of making a uniform direction of magnetization is called initialization. In addition, mark $B_1$, which is magnetized in the "A direction," is formed in a track. One of the marks, $B_0$ or $B_1$, is taken as the informational unit, and information is expressed using the presence/absence and/or the length of the informational unit, which is normally mark $B_1$. In the past, the term "mark" as noted above was called a pit, or a bit, but currently it is being called a mark.

In forming the marks, advantage is taken of the special characteristics of the laser, specifically, the spatially and temporally excellent coherence. The beam of the laser is focused on a small spot in about the same order as the diffractive limit that is determined by the wavelength of the laser light. The focused light irradiates the track surface, and information is recorded by forming a mark with a diameter of 1 $\mu$m or less on the perpendicularly magnetized film. Theoretically, a recording density of approximately $10^8$ marks/cm$^2$ can be achieved during optical recording. This is because the laser beam can be concentrated on spots that have a small diameter of about the same order as its wavelength.

Figure 2:
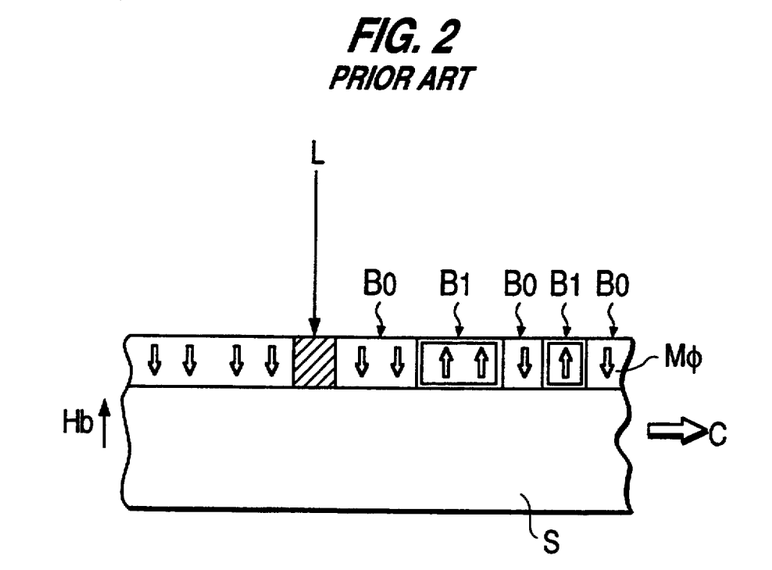
FIG. 2 is a conceptual diagram for explaining the recording principles of the magneto-optical recording method according to an embodiment of the present invention.

As shown in FIG. 2, during magneto-optical recording the disk moves in the direction "C" and, laser beam L is focused on and selectively heats perpendicularly magnetized film M$\phi$. In that interval, recording magnetic field Hb, in the direction opposite to the initialized direction, is applied from outside on the heated portion. When this is done, the coercivity Hc of the portion that is locally heated is reduced and becomes smaller than the recording magnetic field Hb. As a result, the magnetization of this portion is lined up in the direction of recording magnetic field Hb. Marks magnetized in the opposite direction are also formed in this way.

Figure 3:
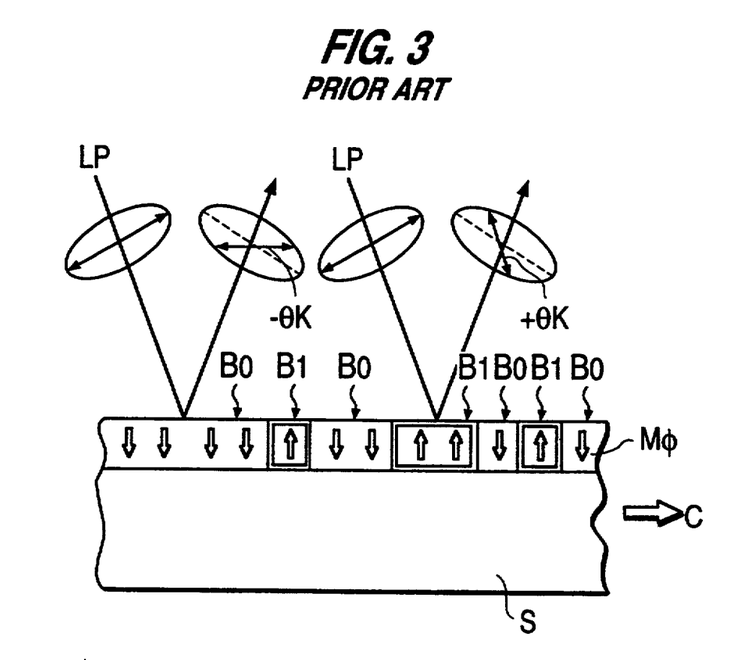
FIG. 3 is a conceptual diagram for explaining the playback principles of the magneto-optical recording method according to an embodiment of the present invention.

FIG. 3 shows the principles of information playback based on magneto-optical effects. Light is an electromagnetic wave which has electromagnetic field vectors that are normally dispersed in all directions on a perpendicular plane in the light path. When light is converted to linear polarized light Lp and is then irradiated on a perpendicularly magnetized film M$\phi$, the light will either be reflected by that surface, or will pass through the perpendicularly magnetized film. At this time, the plane of polarization will rotate according to the direction of magnetization. The phenomenon of this rotation is called the "magnetic Kerr effect" or the "magnetic Faraday effect."

For example, if the plane of polarization of the reflected light rotates $+\theta_K$ degrees in relation to the "A direction" ("upward direction") magnetization, then it will rotate $-\theta_K$ degrees in relation to the "anti-A direction" ("downward direction") magnetization. Consequently, when the axis of a photo-analyzer (polarizer), not shown in the drawings, is set perpendicularly to the plane tilted $-\theta_K$ degrees, the light that is reflected from mark $B_0$, which is magnetized in the "anti-A direction," cannot pass through the analyzer. As opposed to this, the portion of the light that is reflected from mark $B_1$, which is polarized in the "A direction," and that is multiplied by $(\sin 2\theta_K)^2$ passes through the analyzer, and is captured by a detector (opto-electric conversion means), also not shown in the drawings. As a result, mark $B_1$ magnetized in the "A direction" is seen as brighter than mark $B_0$ which is polarized in the "anti-A direction," and produces a strong electric signal in the detector. Consequently, because the electric signals from this detector are modulated according to the recorded information, the information can be played back.

Figures 4, 5A, 5C, 6:
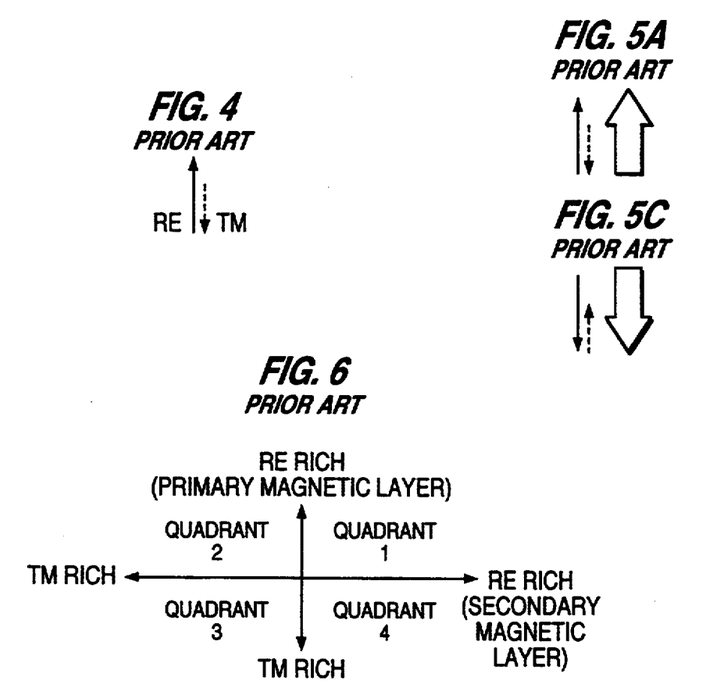
FIG. 4 is an explanatory diagram for the purpose of comparing the vector (solid line arrow) which indicates the sub-lattice magnetization of the rare earth (RE) atoms with the vector (dotted line arrow) which indicates the sub-lattice magnetization of the transition metal (TM) atoms.
FIGS. 5A-5D are explanatory diagrams illustrating the relationship between the vectors of the sub-lattice magnetization (solid line arrow and dotted line arrow) and the vectors that indicate the direction of the magnetization of the alloy (outline arrows) in four different situations.
FIG. 6 is an explanatory diagram illustrating that the two layer magnetic film can be divided into four quadrants (quadrants 1-4) when each of the primary and secondary magnetic layers are divided into either RE rich or TM rich type layers.
Figure 5B:
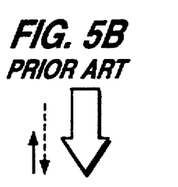
Figure 5D:
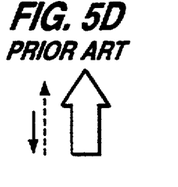

The perpendicularly magnetized film is formed of magnetic layers which are preferably a non-crystalline ferromagnetic body composed of an alloy of a transitional metal (abbreviated "TM" hereinafter) and a heavy rare earth metal (abbreviated "RE" hereinafter). Examples of TM include Fe and Co, and examples of RE include Gd, Tb, Dy and Ho. The direction and size of the magnetism outside of the alloy is determined by the relationship between the direction and size of the magnetism within the alloy of the sub-lattice magnetization of the TM and the direction and size of the sub-lattice magnetization of the RE as shown in FIG. 4. For example, as shown in FIGS. 5A–5D, the direction and size of the sub-lattice magnetization of TM is expressed by the vector indicated by the dotted line arrow, the sub-lattice magnetization of RE is expressed by the vector indicated by the solid line arrow, and the direction and size of the magnetization of the alloy as a whole is expressed by the vector indicated by the outlined arrow. The outlined arrow (vector) at this time is expressed as the sum of the dotted line arrow (vector) and the solid line arrow (vector). However, because of the mutual action of the sub-lattice magnetization of TM and the sub-lattice magnetization of RE within the alloy, the dotted arrow (vector) and the solid line arrow (vector) always run in opposite directions. Consequently, the sum of the dotted line arrow (vector) and the solid line arrow (vector) is the vector of the alloy, and is zero when both have equal strength (specifically, the size of the magnetism expressed externally is zero). The alloy composition when this is zero is called a "compensation composition." When the composition is other than this, the alloy has the outlined arrow (vector) which has a strength equal to the difference in strength of the sub-lattice magnetizations and has a direction equal to the direction of whichever vector is larger.

Thus, the magnetized vector of the alloy can be expressed by writing the dotted line vector and the solid line vector next to each other as, for example, in FIG. 4. The states of RE and TM sub-lattice magnetization can be broadly classified four ways as is indicated in FIGS. 5A–5D, respectively. The magnetic vectors (outlined arrow) of the alloy for each of these states is shown corresponding to FIGS. 5A–5D. For example, if the RE vector is larger than the TM vector and directed upwards, the states of the sub-lattice magnetizations are indicated by the solid and dotted lines in FIG. 5A, and the magnetic vector of the alloy is indicated by the outlined arrow.

A given alloy composition is called by the name of whichever vector is stronger of the TM vector and the RE vector, and is referred to as TM rich or RE rich. The direction of the magnetization of the alloy as a whole agrees with the direction of the TM (or RE) sub-lattice magnetization of the TM (or RE) rich alloy.

Each of the primary and secondary magnetic layers is divided into a TM rich composition or an RE rich composition. Consequently, when the composition of the primary magnetic layer is taken as the vertical axis coordinate and the composition of the secondary magnetic layer is taken as the horizontal axis coordinate, the disk as a whole can be classified into the four kinds of quadrants indicated in FIG. 6. In FIG. 6, the intersection of the coordinates expresses the compensation composition of both layers.

When the magnetism of the magnetic layers is exchanged coupled, the exchange coupling force $\sigma_W$ works between the magnetic layers. Exchange coupling force $\sigma_W$ acts in the same direction as the direction of the sub-lattice magnetization of the TM and RE, respectively. For this reason, when the magnetism of both layers is exchange coupled there are two kinds of stable two-layer film: (1) a stable two-layer film when the direction of the primary magnetic layer magnetization and the direction of the secondary magnetic layer magnetization are parallel, and (2) a stable two-layer film when the directions of magnetization of the two magnetic layers are anti-parallel. In either case, in a stable state, the directions of the TM sub-lattice magnetization of both magnetic layers agree. Naturally, the directions of RE sub-lattice magnetization of both magnetic layers agree. The first kind of two layer film shall be called the parallel ("P") type and the second kind of two layer film shall be called the anti-parallel ("A") type. The parallel type is unstable when the directions of magnetization of the two layers are anti-parallel, and at that time a magnetic wall is formed between the layers. The anti-parallel type is unstable when the directions of magnetization of the layers are parallel, and at that time a magnetic wall is formed between layers. In the unstable state, the directions of the TM sub-lattice magnetization of both layers do not agree, and the directions of the RE sub-lattice magnetization of both layers do not agree. However, even if it is called "unstable," it is provisionally stable, and that state can persist for a couple of years to several dozen years. The P type belongs to the first and third quadrants indicated in FIG. 6, and the A type belongs to the second and fourth quadrants.

In either case, the magneto-optical recording disks, up to this point in time, have the advantage that it is possible to repeatedly record and playback. However, when the disks are accidentally exposed to an excessive magnetic field or are exposed to an abnormally high temperature, there is the problem that the information may be erased.

SUMMARY OF THE INVENTION

An object of the present invention is to overcome the previously-mentioned problems of the known magneto-optical recording disks.

Another object of the present invention is to provide a magneto-optical disk and a playback method thereof which abandons the "advantage of having the possibility of repeatedly recording and playing back," and is used as a specialized form of a dedicated use playback type disk and method thereof. Moreover, this disk has the advantage that storage of information is increased as compared to conventional dedicated use playback type optical disks (for example, compact disks (CD) and laser disks (LD)).

Additional objects and advantages of the invention will be set forth in part in the description which follows, and, in part, will be obvious from the description, or may be learned by practice of the invention.

The foregoing and other objects of the present invention are achieved by providing a magneto-optical disk having a substrate and at least two magnetic film layers which are a primary magnetic layer and a secondary magnetic layer, and which are formed on the substrate, respectively, and in which the magnetism of both layers is exchanged coupled at a temperature below the curie points of both layers. Between the layers and at a temperature below the curie points of both, primary micro-regions $a_0$ are provided in which the magnetic wall that is produced between both layers is canceled by the magnetic inversion of the primary magnetic layer, and secondary micro-regions $a_1$ are provided in which the magnetic wall that is produced between the layers is canceled by the magnetic inversion of the secondary magnetic layer. One of the previously-mentioned micro-regions is taken to be the informational unit such that the presence/absence and/or length of that informational unit represents information.

A magneto-optical disk is also provided such that the primary magnetic layer and secondary magnetic layer of the magneto-optical disk both have perpendicularly magnetized anisotropic properties.

A magneto-optical disk is yet further provided wherein the primary magnetic layer comprises two layers, one having a relatively high curie point layer and a second layer having a relatively low curie point layer, in the order seen from the direction of the laser beam irradiation.

A magneto-optical disk is also provided wherein the secondary magnetic layer has a different film thickness in the previously-mentioned primary micro-region $\alpha_0$ than in the previously-mentioned secondary micro-region $\alpha_1$.

In addition, there is provided a magneto-optical disk, wherein the secondary magnetic layer has a different coercivity in the primary micro-region $\alpha_0$ than in the secondary micro-region $\alpha_1$.

Finally, the foregoing and other objects of the present invention are achieved by providing a magneto-optical playback method having the following steps:

Step 1: preprocessing the magneto-optical disk of the present invention to a state in which magnetic walls are produced between the layers in the primary micro-regions $\alpha_0$ in which the direction of magnetization of the primary layer is uniform and playback, at least, is accomplished from this;

Step 2: increasing the temperature of both magnetic layers up to the temperature $T_R$, which is the temperature at which the magnetic walls existing between the layers in the primary micro-regions $\alpha_0$ are canceled, and in which the magnetization of both layers is not canceled when irradiating the magneto-optical disk with a laser beam; and Step 3: converting the reflected light, in which the previously-mentioned laser beam is reflected by the disk at temperature $T_R$, or the permitted light, in which the laser beam permeates the disk at temperature $T_R$, to electric signals by optical processing.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

The present invention is now described with reference to the drawings which were briefly described above and which are now referred to in order to provide a detailed description of the preferred embodiments. Like parts will be identified with like reference numerals. Here, an explanation will be given of an example of a magneto-optical disk having a perpendicularly magnetized film.

Figure 1:
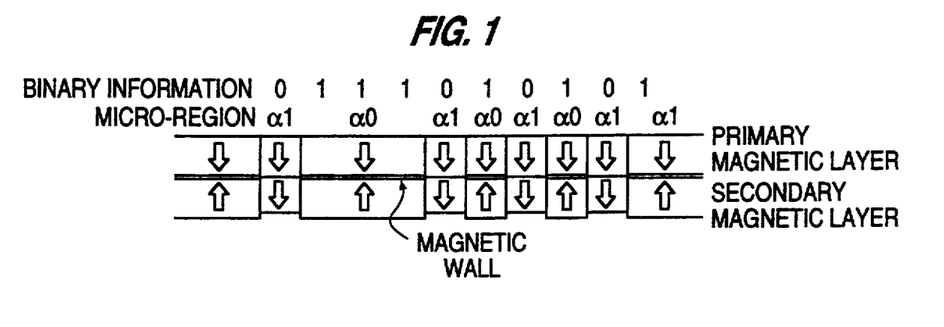
FIG. 1 is a conceptual diagram showing the perpendicular cross-section of a magneto-optical disk according to an embodiment of the present invention.

FIG. 1 is a conceptual diagram showing a perpendicular cross-section of a magneto-optical disk according to an embodiment of the present invention. The magneto-optical disk has a primary magnetic layer and a secondary magnetic layer. The disk has a primary micro-region $\alpha_0$ in which the magnetic wall that is produced between both layers is canceled by the primary magnetic layer being magnetically inverted, and a secondary micro-region $\alpha_1$ in which the magnetic wall which is produced between both layers is canceled by the secondary magnetic layer being magnetically inverted.

Figure 7A:
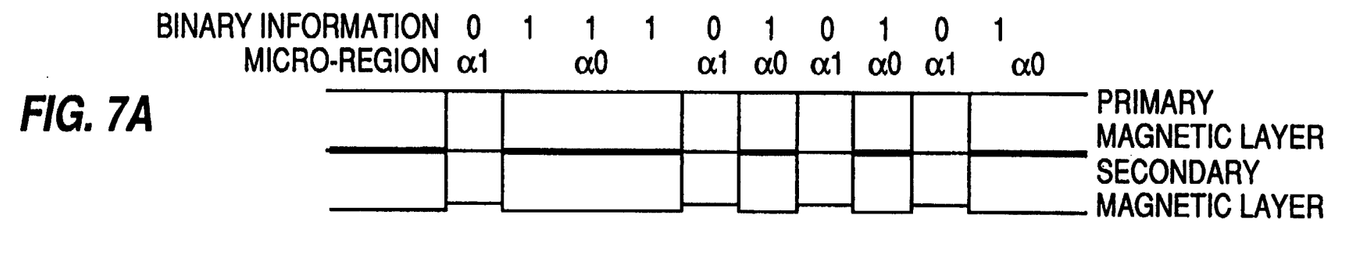
FIGS. 7A-7D are conceptual diagrams illustrating the perpendicular cross-section of a magneto-optical disk according to an embodiment of the present invention, and for explaining four respective states.

FIG. 7A is a conceptual diagram showing a perpendicular cross-section of a magneto-optical disk according to an embodiment of the present invention. In FIG. 7A, the direction of magnetization is not indicated because it is diffuse. This does not apply when the coercive force and curie point at room temperature is greater for either the primary or secondary magnetic layers of the disk.

In a disk according to a preferred embodiment of the present invention, there is a primary magnetic layer and a secondary magnetic layer and the magnetism of the layers is exchange coupled at a temperature below the curie points of both layers. As indicated above, the disk has a primary micro-region $\alpha_0$ in which the magnetic wall that is produced between both layers is canceled by the primary magnetic layer being magnetically inverted, and a secondary micro-region $\alpha_1$ in which the magnetic wall which is produced between both layers is canceled by the secondary magnetic layer being magnetically inverted. One of the micro-regions $\alpha_0$ and $\alpha_1$ is taken as the informational unit, and information is expressed by the presence/absence and/or length of this informational unit. Specifically, this informational unit has the same function as the pit, bit or the mark.

Here, the disk is pre-processed and a representative example of pre-processing will be now explained. This explanation will be divided into the P (parallel) type and A (anti-parallel) type disks. When the disk is the P type, a post-process step is performed in addition to a pre-process step. In the pre-process step, primary outer magnetic field $H_{ex1}$, which is larger than the secondary magnetic layer coercivity $H_{C2}$ of the primary micro-region $\alpha_0$, is applied in the "A direction" ("upward" direction) in relation to the disk. $H_{ex1}$ fulfills the following equation (1):

$$H_{ex1} > H_{C2} \sigma w/2\, M_{s2} t_2. \tag{1}$$

Figure 7B:
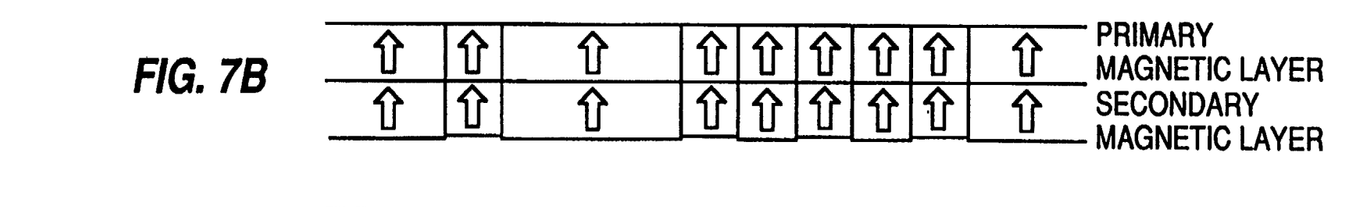

Here, $M_{s2}$ is the saturation magnetization of the primary micro-region of the secondary magnetic layer, and $t_2$ is the film thickness of the primary micro-region of the secondary magnetic layer. When this is done, the magnetization of both the primary and the secondary magnetic layers are uniformly oriented in the A (upward) direction. This state is indicated in FIG. 7B. At this time, if the temperature of the magnetic layer is made higher than room temperature, the coercivity may be lowered. In this situation, this is completed with a small primary outer magnetic field $H_{ex1}$. The micro-region may also be irradiated by a laser beam in order to heighten the temperature of the magnetic layers. In the post-process step, the secondary outer magnetic field $H_{ex2}$, which is greater than the coercivity $H_{C1}$ of the primary magnetic layer and smaller than the coercivity $H_{C2}$ of the secondary magnetic layer of primary micro-region $\alpha_0$, is applied in the "anti-A" (downward) direction in relation to the disk. $H_{ex2}$ fulfills the following equation (2):

$$H_{C1} + \pi w/2\, M_{s1} t_1 i < H_{ex2} < H_{C2} - \sigma w/2\, M_{s2} t_2. \tag{2}$$

Here, $M_{s1}$ is the saturation magnetization of the primary magnetic layer, and $t_1$ is the film thickness of the primary magnetic layer. At this time, the temperature of the magnetic layer may be raised higher than room temperature. However, the temperature is below the curie points of both layers. As a result, the magnetization of the primary magnetic layer is uniformly in the anti-A direction $\downarrow$. Also at this time, the magnetization that is uniformly arranged in the secondary magnetic layer of at least the primary micro-region $\alpha_0$ is not inverted. For this reason, the primary magnetic layer fulfills the following equation (3):

$$H_{C1} > \sigma w/2\, M_{s1} t_1. \tag{3}$$

Moreover, the secondary magnetic layer of primary micro-region $\alpha_0$ fulfills the following equation (4):

$$H_{C2} > H_{ex2} + \sigma w/2\, M_{s2} t_2. \tag{4}$$

In addition, at this time, the magnetization of the secondary magnetic layer of secondary micro-region $\alpha_1$ may be inverted by $H_{ex2}$, and may also be inverted by the temperature raising process using laser irradiation as described later.

Figure 7C:
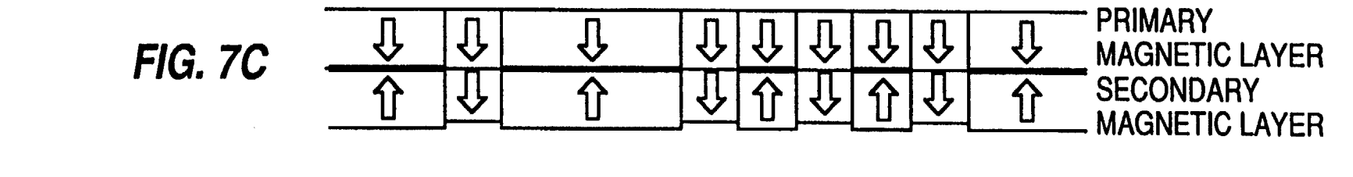

The direction of magnetization of the P type is stable when the directions of magnetization of both layers are parallel. In that case, the directions of magnetization of both layers in at least the primary micro-region $\alpha_0$ are anti-parallel, and it is unstable there (however, it is provisionally stable). For this reason, a magnetic wall (what is indicated by the thick solid line in FIG. 7C) is produced between the layers at micro-region $\alpha_0$, as shown in FIG. 7C. Here, pre-processing is complete.

With the A type, primary external magnetic field $H_{ex1}$ is applied in the "A direction" in relation to the medium. Here, $H_{ex1}$ fulfills equation (5) as follows:

$$H_{ex1} > H_{C1} + \sigma w/2\, M_{s1} t_1. \tag{5}$$

$H_{ex1}$ also fulfills equation (6) as follows:

$$H_{ex1} > H_{C2} + \sigma w/2\, M_{s2} t_2. \tag{6}$$

At this time, the magnetization of the secondary magnetic layer of secondary micro-region $\alpha_1$ may be re-inverted when $H_{ex1}$ is varied, and may also be inverted in a temperature raising process using laser irradiation as described later.

Figure 7D:
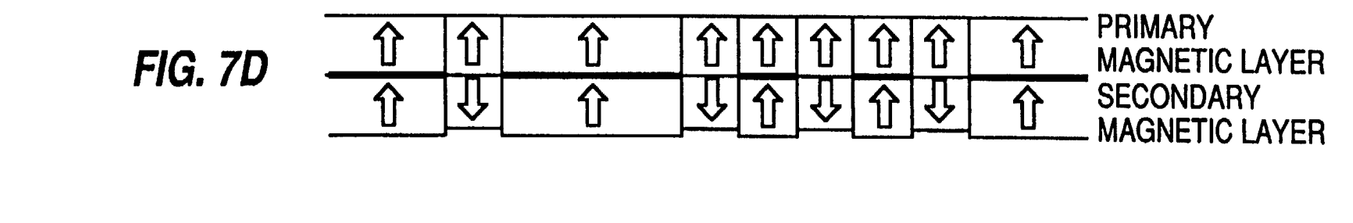

With the A type, the direction of magnetization is stable when the directions of magnetization of both layers are anti-parallel. When this is the case, the directions of magnetization of both layers in at least the primary micro-region $\alpha_0$ are parallel, and it is unstable there (however, it is provisionally stable). For this reason, a magnetic wall (what is indicated by a thick solid line in FIG. 7D) is produced between the layers at micro-region $\alpha_0$. This state is indicated in FIG. 7D. With this, pre-processing is complete.

Figure 8:
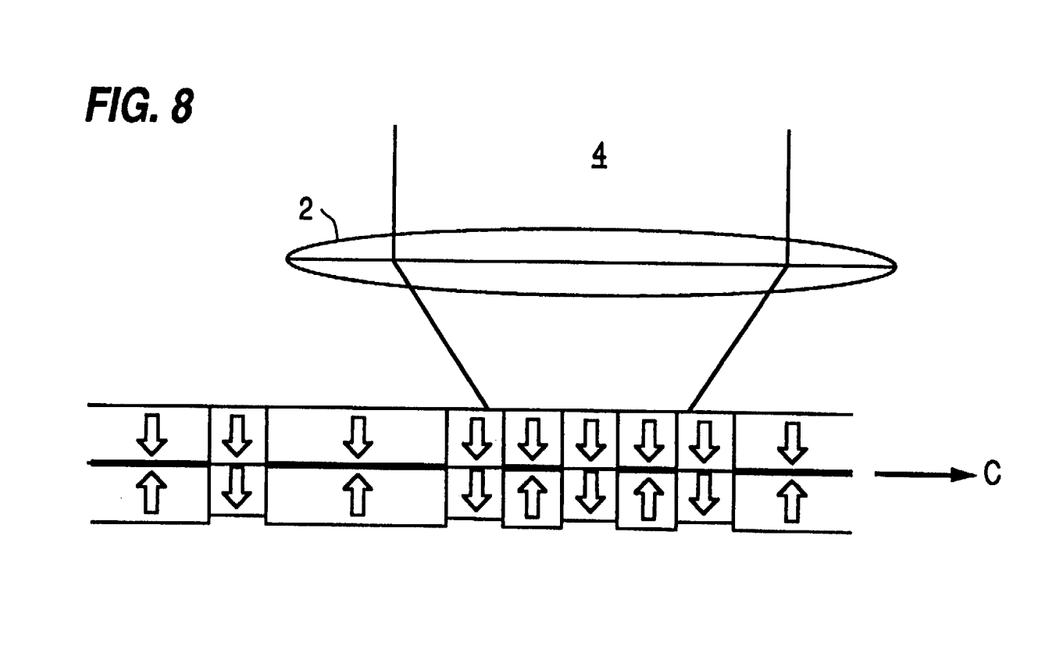
FIG. 8 is a conceptual diagram illustrating the perpendicular cross-section of a magneto-optical disk according to an embodiment of the present invention, and for explaining the conditions in which the magneto-optical disk is irradiated by the laser beam.
Figure 9:
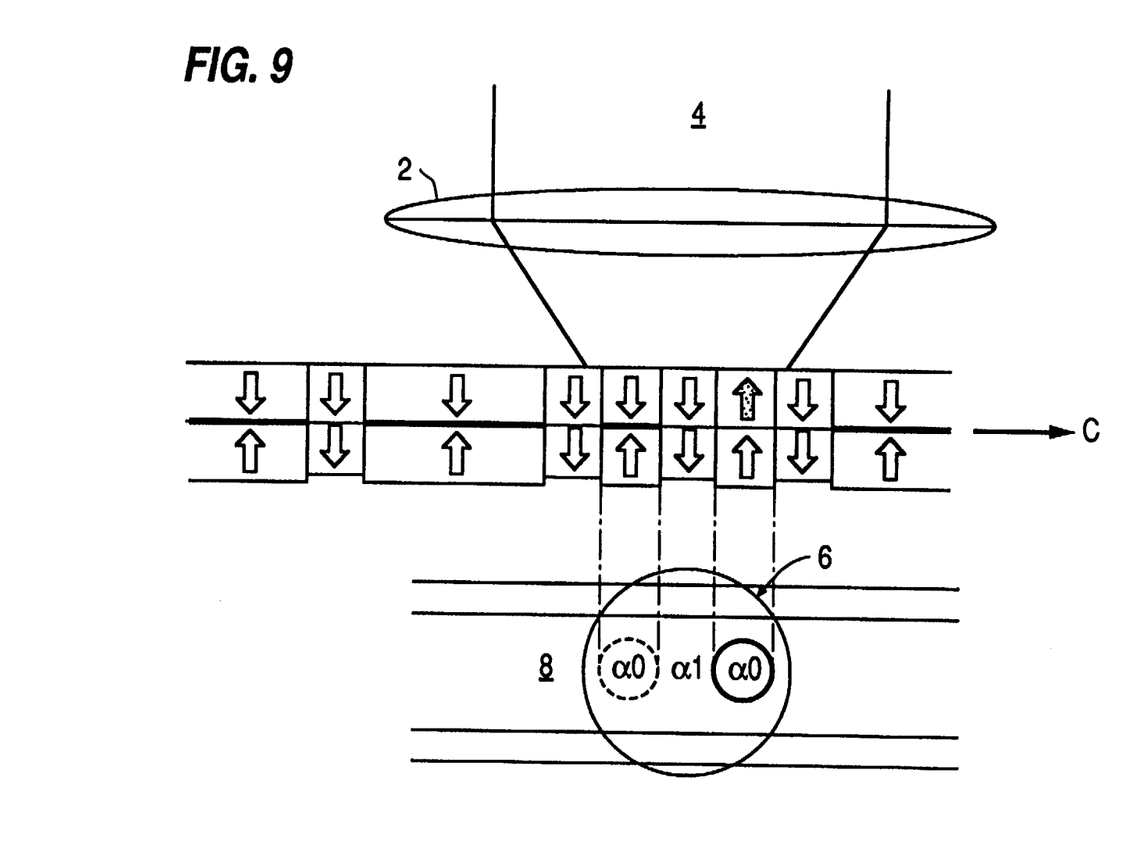
FIG. 9A is a schematic view illustrating the perpendicular cross-section of a magneto-optical disk of the present invention and FIG. 9B is a top view therefor explaining the conditions the magneto-optical disk is irradiated by the laser beam.

Next, the playback steps for the method according to the invention as briefly described above in the SUMMARY OF THE INVENTION section will now be further explained. The disk is irradiated by a playback level laser beam from the primary magnetic layer side. The disk is rotated in the natural direction. The spot diameter of the laser beam on the disk is somewhat larger than three times the diameter of the smallest micro-regions $\alpha_0$ and $\alpha_1$. For this reason, three of the smallest micro-regions $\alpha_0$ and $\alpha_1$ are included within the spot diameter. As shown in FIG. 8, the playback apparatus has an objective lens 2, a laser beam 4 incident upon the disk, and a direction C of the disk movement. As shown in FIG. 9, the laser beam has an outer spot diameter 6 and the disk has track 8. The three parts in FIGS. 8 and 9 are the binary information 1 0 1. In a conventional CD and LD, the three possibilities of 1 0 1, 1 1 0 and 0 1 1 cannot be distinguished in this situation. That is because there is almost no distinction in the amount of light reflected from the spot. Likewise, when considering the smallest micro-regions $\alpha_0$ and $\alpha_1$ which are in the same position on the neighboring two tracks, the three values of 1 0 1, 1 1 0 and 0 1 1 cannot be distinguished. For this reason, the diameter of the smallest micro-region $\alpha_0$ or the smallest micro-region $\alpha_1$ cannot be smaller than the spot diameter in a conventional CD or LD. The spot diameter is obtained by focusing the laser beam with an objective lens. For this reason, the spot diameter from the diffraction boundary cannot be made smaller than the wavelength of the laser. When using current semiconductor lasers, a spot diameter under approximately 1 $\mu$m cannot be obtained.

For this reason, there is a limit to the recording density in conventional CD's and LD's.

Nonetheless, the strength distribution of the laser beam is highest near the center. For this reason, the temperature distribution within the spot is highest near the center. Also, because the disk is moving, the temperature of the magnetic layer which is equivalent to the part after being in the spot becomes a higher temperature than other parts because of the heat accumulation effect. For this reason, the micro-region $\alpha_0$ indicated by the solid line circle in FIG. 9 is increased to temperature $T_R$, which is the temperature in which the magnetic wall that is present between the layers is canceled at primary micro-region $\alpha_0$, and in which the magnetization of both layers is not canceled. For this reason, the direction of the magnetization of the primary magnetic layer of micro-region $\alpha_0$ indicated by the solid circle receives the exchange coupling force from the secondary magnetic layer and is inverted. As a result, the magnetic wall is canceled. At this time, a supplementary magnetic field may be applied in the spot position. By this, the magnetization of the primary magnetic layer can easily be inverted, and the minimum temperature $T_R$ can be lowered.

The magnetization of the primary magnetic layer becomes the "A direction" ↑ which is the same as the secondary magnetic layer (with the A type, however, it becomes the "anti-A direction" ↓). This state is indicated in FIG. 9. On the other hand, even if it were to become the temperature $T_R$ at micro-region $\alpha_1$, because it is a state in which the magnetization of the secondary magnetic layer is inverted and the magnetic wall has already been lost, the direction of magnetization of the primary magnetic layer is not inverted. In contrast to this, while micro-region $\alpha_0$, indicated by the dotted line in FIG. 9, is the same kind of micro-region $\alpha_0$ in which an exchange coupling force is received by a magnetic wall, because the temperature is not increased to $T_R$, the direction of the magnetization of the primary magnetic layer is not inverted.

Consequently, in the position of the diagram of FIG. 9, only micro-region $\alpha_0$ (highlighted by the solid line circle in FIG. 9) indicates the magnetization within the spot of the "A direction" ↑ in the P type (with the A type, the "anti-A direction" ↓), and regions other than that indicate the magnetization of the "anti-A direction" ↓ in the P type (in the A type, the "A direction" ↑). For this reason, even if there are micro-regions $\alpha_0$ in front and back, or left and right, only one micro-region $\alpha_0$ indicated by the solid line circle is "warmed" within the spot, and only one micro-region $\alpha_0$ can be detected. If there is only one micro-region $\alpha_0$ detected, then when magneto-optically processing the reflected light or the permitted light, the amount of light decrease or increase is detected. Thus, if the light is converted to electrical signals by an optical electric conversion means, the "1" of binary information can be detected for just one micro-region $\alpha_0$.

Next, the disk moves only the amount of the minimum micro-region $\alpha_0$ or $\alpha_1$. In the example of FIG. 9, micro-region $\alpha_1$ is the region that becomes temperature $T_R$ at this time. However, because micro-region $\alpha_1$ is in a state in which the magnetization of the secondary magnetic layer has been inverted and the magnetic wall has already been canceled, the direction of the magnetization of the primary magnetic layer is not inverted. Consequently, the entire region within the spot indicates a magnetization of the "anti-A direction" ↓ in the P type (in the A type, it is the "A direction" ↑), and the amount of decreased or increased light cannot be detected. Specifically, micro-region $\alpha_0$ is not detected.

If the disk was again moved only the amount of minimum micro-region $\alpha_0$ or $\alpha_1$, then the following results occur. In the example in FIG. 9, the micro-region $\alpha_0$ indicated by the dotted line circle is the micro-region that is "warmed" this time, and the micro-region $\alpha_0$ in the dotted line circle is the only micro-region to be detected. The above outlines the principles of the playback method. After being played back one time, "warming" becomes impossible because the magnetic wall has been canceled. However, it is possible to repeatedly pre-process the disk as previously described, and it may be played back again after pre-processing. In this situation, the application of primary external magnetic field $H_{ex1}$ can be omitted, and thus for the P type, only the secondary external magnetic field $H_{ex2}$, which satisfies the previously-described equation (2), need be applied. When substituting for the primary external magnetic field $H_{ex1}$ in the A type, only secondary external magnetic force $H_{ex2}$ which satisfies equation (7) described below need be applied:

$$H_{ex2} > H_{C1} + \sigma_W/2 \, M_{s\alpha}t_1. \tag{7}$$

If this is done, pre-processing of the magneto-optical disk may be completed with only the application of secondary external magnetic field $H_{ex2}$ for both the P type and the A type.

Because the magnetic layers are thin, they are generally formed on a disk shaped substrate, for example, a glass or plastic substrate. The substrate may have grooves that $\alpha_1$ form the guides for tracking. Even if there are not grooves, because micro-regions $\alpha_0$ or are formed in the tracks, tracking is possible based on this.

The primary magnetic layer and the secondary magnetic layer are formed in continuity on the substrate by a vacuum thin film formation technology, such as vacuum deposition, sputtering, or the like. Transition metals and heavy rare earth alloys are preferable as the materials for the magnetic layers, but the materials are not limited to this. Also, it is preferable that the magnetic layers form a perpendicularly magnetized film, but it may also be a horizontally magnetized film. The thickness of each of the magnetic layers is generally about 100–500 Å. Also, after the magnetic layers are formed, a protective layer is formed to protect the magnetic layers.

Here, in order to form micro-regions $\alpha_0$ or $\alpha_1$ along the track in the secondary magnetic layer, it is necessary to have patterning in a fixed pattern according to the desired information. Photolithography is used to do the patterning. Photo resist is uniformly coated on the protective layer on the magnetic layers that have been formed, and this resist is irradiated by a laser beam following a fixed pattern or the inverse pattern of this. When it is desired that the minimum micro-regions $\alpha_0$ or $\alpha_1$ be made as small as possible and thereby the recording density be increased, it is necessary to use a beam with as short a wavelength as possible. The beam is not limited to visible light, and an electron beam, x-rays and ultraviolet rays may be used. After irradiation, the resist pattern is developed and obtained.

Next, the secondary magnetic layer is etched. The part that is not coated with resist is etched and the film thickness is reduced. Finally, the remaining resist pattern is eliminated by washing. As a result, a secondary magnetic layer which has a fixed pattern is obtained. Also, the magnetic properties of the secondary magnetic layer may be changed without etching by using ion implantation.

Depending on the situation, after the secondary magnetic layer has been uniformly formed, the patterning may be done directly by laser marking technology. Depending on the situation, an exchange coupling force $\sigma_W$ adjustment layer may be formed between the primary magnetic layer and the secondary magnetic layer. The adjustment layer may be formed on the entire piece, may be formed only on the primary micro-region $\alpha_0$, or may be formed only on the secondary micro-region $\alpha_1$. The thickness of the $\sigma_W$ adjustment layer is generally selected from a range of 1-500 Å. However, the $\sigma_W$ adjustment layer must not cancel out the exchange coupling force. The primary and secondary magnetic layers may be structured from a single layer or multiple layers, respectively. Also, the boundary of the primary and secondary magnetic layers need not be clear and may gradually change from one to the other. When playing back information from reflected light, the primary magnetic layer is irradiated by a laser (linear polarity). In this situation, a tertiary magnetic layer with a large $\theta_K$ may be provided on the read side of the primary magnetic layer. The direction of the magnetization of the tertiary magnetic layer corresponds in parallel or anti-parallel based on the exchange coupling in the direction of magnetization of the primary magnetic layer from room temperature to $T_R$.

The present invention is explained further below with reference to working examples, but the present invention is not limited to these working examples.

Working Example 1—A Type Disk (1) A 2P substrate (photo-polymer layer which is formed on a glass substrate) is used on which multiple concentric circular grooves with a pitch of 1.2 μm and a depth H of 700 Å are formed. The diameter of the 2P substrate is 130 mm.

(2) An RF magnetron sputtering device is used, and the 2P substrate and the various targets are set in the chamber of this device. Once the air is evacuated from within the chamber to a degree of vacuum that is $7\times10^{-7}$ Torr. or less, $5\times10^{-3}$ Torr. of argon gas is introduced.

Initially, an Si target is used, reactive sputtering is conducted by introducing $N_2$ gas added to Ar gas into the chamber, and silicon nitride (primary protective layer) is formed on the resin layer to a thickness of 700 Å.

Next, the introduction of $N_2$ gas is terminated, and sputtering is conducted using a GdFeCo group alloy target in $5\times10^{-3}$ Torr. Ar gas. By doing this, the tertiary magnetic layer comprising a GdFeCo group perpendicularly magnetized film is formed on the primary protective layer. The tertiary magnetic layer has a thickness of 300 Å, is TM rich, has a coercivity $H_C$ of 100 oersted, and has a curie point of 400° C. or more.

Maintaining the vacuum state as it is, a DyFeCo group alloy target is substituted and sputtering is conducted. Based on this, the primary magnetic layer comprising a DyFeCo group perpendicularly magnetized film is formed on the tertiary magnetic layer. The primary magnetic layer has a film thickness $t_1$ of 250 Å, is TM rich, has a coercivity $H_{C1}$ of 1500 oersted, and has a curie point of 180° C.

In addition, sputtering is conducted using a TbDyFeCo group alloy target. Based on this, the secondary magnetic layer comprising a TbDyFeCo group perpendicularly magnetized layer is formed on the primary magnetic layer. The secondary magnetic layer has a film thickness $t_2$ of 500 Å, is RE rich, has a coercivity of $H_{C2}$ of 4000 oersted, and has a curie point of 320° C.

Once again, an Si target is used, reactive sputtering is conducted by introducing $N_2$ gas added to Ar gas into the chamber, and a protective layer of silicon nitride 300 Å thick is formed on the secondary magnetic layer.

After the intermediate product obtained is taken from the sputtering equipment, photo-resist is coated on the protective layer using a spin coater. After it has been pre-baked, the intermediate product is irradiated with a Kr laser ($\lambda=351$ nm) while being rotated.

The laser is modulated to a fixed frequency (standard information). When developing and post-baking, the fixed resist pattern is obtained. The island shaped resist of the pattern (resembling pits) that follows along the tracks is lined up point-by-point. One island has a width of 0.3 μm and a length of 0.3 μm. The space before and after the islands is 0.3 μm. Next, dry etching, using Ar plasma, is conducted. Based on this, the protective layer of the part other than the islands is eliminated. Then, 350 Å of the secondary magnetic layer is also etched.

The intermediate product obtained in this way is again set in the sputtering equipment. At the same time, the various targets are also set. Once the air inside the chamber is evacuated to a degree of vacuum $7\times10^{-7}$ Torr. or less, $5\times10^{-3}$ Torr. of Ar gas is introduced.

Finally, reactive sputtering is again conducted by introducing $N_2$ gas added to Ar gas into the chamber using an Si target, and a protective layer of silicon nitride is formed to a thickness of 700 Å.

Working Example 2—Playback Equipment

Equipment for a magneto-optical disk having an A type magnetic film generally comprises disk rotation means, primary external magnetic field $H_{ex1}$ application means, laser beam light source which is positioned downstream from the $H_{ex1}$ application means, supplementary magnetic field application means which is positioned on the side opposite the light source, and magneto-optical processing means which is positioned on the same side as the light source. The primary external magnetic field $H_{ex1}$ application means comprises a permanent magnet which outputs a magnetic field of 10K Oe (on the disk plane) of the "A direction" ↑. The supplementary magnetic field application means comprises a permanent magnetic that outputs a magnet field of 300 Oe (on the disk plane) of "anti-A direction" ↓. The light source is a $\lambda=700$ nm semiconductor laser with a nominal aperture (NA)=0.55. The magneto-optical processing means comprises a polarized light or non-polarized light beam splitter, an analyzer and a detector that is placed between the light source and the disk.

The disk is rotated by the rotation means, and $H_{ex1}$ is first applied. The pre-processing is completed by this step. Then, the disk is irradiated by the laser beam. The beam that is emitted from the light source passes through a beam splitter (or is reflected), falls on the disk and is reflected by the disk. This reflected light is reflected by the beam splitter (or passes through), and heads toward the analyzer and detector. The analyzer may also be a polarized light beam splitter, and in this case the light which includes the information is split in two and sent out. The outgoing light is converted to electric signals by the detector used. By removing the inequities from the modified electric signals, signals with a high C/N ratio can be obtained.

In the P type equipment, the secondary external magnetic field $H_{ex2}$ application means is added between the $H_{ex1}$ application means and the light source, and the direction of the supplementary magnetic field application means is made to be in the "A direction" ↑.

Working Example 3—Playback Method

A working example of the playback method according to the invention is described below.

Figure 10A:
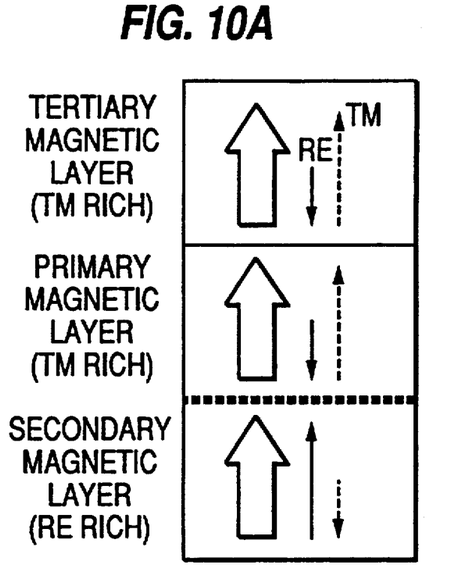
FIGS. 10A and 10B are conceptual diagrams indicating the perpendicular cross-section of a micro-region $\alpha_0$ of a magneto-optical disk in Working Example 1 of an embodiment of the present invention, and also indicating the transition of the state of magnetization of the magnetic layers in Working Example 3.
Figure 10B:
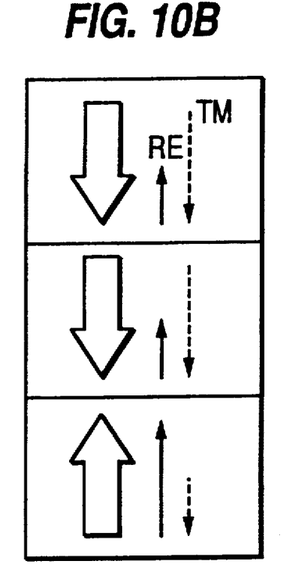

A disk of Working Example 1 is set in the equipment of Working Example 2, and the disk is rotated at 1800 rpm. When the disk passes close to the $H_{ex1}$ application means, the magnetization of the tertiary, primary and secondary magnetic layers receive a magnetic field of 10K Oe, and are uniformly arranged in the "A direction" ↑. The micro-regions $\alpha_0$ during this state are indicated by FIGS. 10A and 10B.

Because both the tertiary and primary magnetic layers are TM rich at this time, the TM sub-lattice magnetization becomes the "A direction" ↑. Conversely, the RE sub-lattice magnetization of both becomes the "anti-A direction" ↓. Because the direction of the TM sub-lattice magnetization of both layers agree (is parallel), a magnetic wall is not produced even in a micro-region $\alpha_0$ in which an exchange coupling force is active.

On the other hand, because the secondary magnetic layer is RE rich, the RE sub-lattice magnetization becomes the "A direction" ↑, and the TM sub-lattice magnetization becomes the "anti-A direction" ↓. For this reason, the direction of the TM sub-lattice magnetization of the secondary magnetic layer does not agree (is anti-parallel), and a magnetic wall is produced.

When the disk moves away from the $H_{ex1}$ application means and the magnetic layers no longer receive the magnetic field, the magnetic wall energy is released at the micro-regions $\alpha_1$ which were made thinner by etching the secondary magnetic layer, and the magnetization of the secondary magnetic layer is inverted.

The disk pre-processed in this manner finally comes to the position of laser beam (linear polarized light) irradiation. At the irradiation position, the disk is irradiated by the beam from the tertiary magnetic layer. The temperature of the disk goes up rapidly and the coercivity of the primary magnetic layer becomes smaller. Then, the temperature of the magnetic layer at the latter half of the spot (diameter of 1.3 μm) reaches $T_R$. As a result, the primary magnetic layer receives a strong exchange coupling force from the secondary magnetic layer at micro-regions $\alpha_0$ which have a magnetic wall. The exchange coupling force acts so as to make the TM sub-lattice magnetization of the primary magnetic layer agree with that of the secondary magnetic layer ("anti-A direction" ↓). With that, the TM sub-lattice magnetization of the primary magnetic layer of micro-region $\alpha_0$ is inverted, and the magnetic wall dissipates. Because the primary magnetic layer is TM rich, the magnetization of the entire body is converted to the "anti-A direction" ↓. At this time, the primary magnetic layer receives a supplementary magnetic field in the "anti-A direction" ↓. By doing this, the magnetic inversion of the primary magnetic layer and the dissipation of the magnetic wall can occur more easily. Of course, these phenomena will not occur in stabilized micro-regions $\alpha_1$ which do not have a magnetic wall.

On the other hand, the magnetism of the tertiary magnetic layer exchange couples with that of the primary magnetic layer. When the magnetization of the primary magnetic layer is inverted to the "anti-A direction" ↓ in region $\alpha_0$, that of the tertiary magnetic layer also inverts. By processing the beam reflected from the tertiary magnetic layer with the magneto-optical means, information is played back, and the C/N ratio is measured. In this case, two micro-regions $\alpha_0$ of the disk in Working Example 1, as shown in FIG. 9, enter into the spot.

Figure 11:
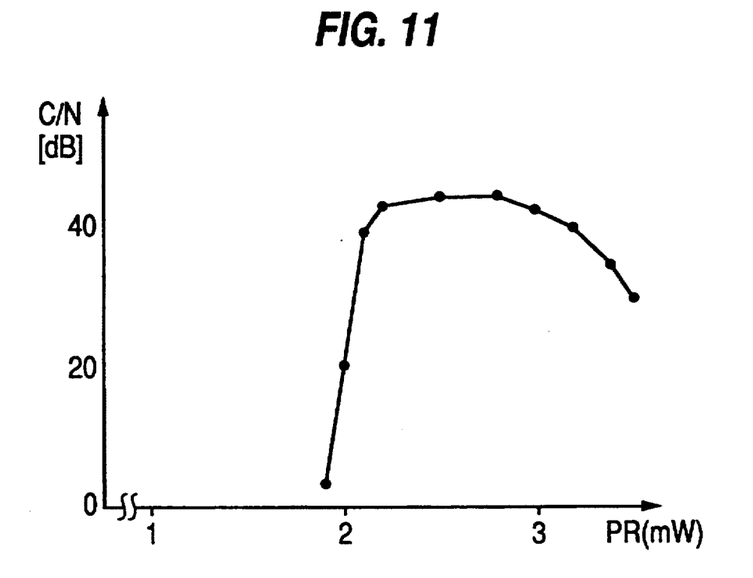
FIG. 11 is a graph indicating the C/N ratio measured in Working Example 3.

The measurement of the C/N ratio above was repeated by varying the laser beam strength PR. These results are indicated in FIG. 11. As a result, the first playback signals were obtained at PR=2.0 mW or more, and the C/N ratio dropped at PR=3.0 mW or more. This led to the following hypothesis. Specifically, with the PR being 2.0 mW or more and 3.0 mW or less, the magnetic inversion of the tertiary and primary magnetic layers occurred for only one micro-region $\alpha_0$. With PR at 3.0 mW or more, the large part of the magnetic layer within the spot reached a temperature $T_R$, and because of this, magnetic inversion occurred at both micro-regions $\alpha_0$ within the spot.

As described above, the present invention offers a dedicated use playback magneto-optical disk. A disk according to the present invention has no problem if an excessively large magnetic field is accidentally encountered or if an abnormally high temperature is encountered, thereby causing the direction of magnetization of the magnetic layer to be disturbed. Specifically, if the above-described pre-processing is done, the information can be played back.

Also, there is the advantage that the information density can be increased as compared to conventional dedicated use playback optical disks (for example, CD's and LD's).

Although a few preferred embodiments of the invention have been shown and described, it will be appreciated by those skilled in the art, that many changes may be made in those embodiments without departing from the principles and spirit of the present invention, the scope of which is defined in the claims add their equivalents.

What is claimed is:

1. A magneto-optical disk comprising:

a substrate;

a magnetic film having a primary magnetic layer and a secondary magnetic layer formed on said substrate, said primary magnetic layer and said secondary magnetic layer being exchange coupled at a temperature below curie points of both said primary and secondary layers;

primary micro-regions in which first portions of a magnetic wall, produced between said primary and secondary magnetic layers, are canceled by a magnetic inversion of said primary magnetic layer at a temperature below said curie points of both said primary and secondary layers; and secondary micro-regions in which second portions of the magnetic wall, produced between said primary and secondary magnetic layers, are canceled by a magnetic inversion of said secondary magnetic layer at a temperature below said curie points of both said primary and secondary layers;

one of said primary micro-regions and said secondary micro-regions being informational units expressing information based upon one of a presence/absence and a length of said informational units.

2. The magneto-optical disk as claimed in claim 1, wherein each of said primary and secondary magnetic layers have perpendicular anisotropy.

3. The magneto-optical disk as claimed in claim 1, wherein said primary magnetic layer comprises:
   a first layer having a relatively high first curie point; and
   a second layer having a relatively low second curie point, said first layer receiving a laser beam irradiation before said second layer.

4. The magneto-optical disk as claimed in claim 1, wherein said secondary magnetic layer has a first film thickness in said primary micro-regions and a second film thickness, different than said first film thickness, in said secondary micro-regions.

5. The magneto-optical disk as claimed in claim 1, wherein said secondary magnetic layer has a first coercivity in said primary micro-regions and a second coercivity, different than said first coercivity, in said secondary micro-regions.

6. A magneto-optical playback method for reproducing information from a magneto-optical disk by irradiating the magneto-optical disk with a laser beam, the method comprising:
   pre-processing a magneto-optical disk having a substrate, a magnetic film with a primary magnetic layer and a second magnetic layer formed on the substrate and in which said primary and secondary magnetic layers are exchange coupled at a temperature below curie points of both said primary and secondary magnetic layers, primary micro-regions in which first portions of a magnetic wall produced between said primary and secondary magnetic layers are canceled by a magnetic inversion of said primary magnetic layer at a temperature below said curie points of both said primary and secondary magnetic layers, secondary micro-regions in which second portions of the magnetic wall produced between said primary and secondary magnetic layers are canceled by a magnetic inversion of said secondary magnetic layer at a temperature below said curie points of both said primary and secondary magnetic layers, the magneto-optical disk being pre-processed to a state where said first portions of the magnetic wall are produced between said primary and secondary magnetic layers in said primary micro-regions and a direction of magnetization of said primary magnetic layer is uniform;
   increasing the temperature of said primary and secondary magnetic layers, by irradiating the magneto-optical disk with the laser beam, up to a given temperature at which said first portions of the magnetic wall existing between said primary and secondary magnetic layers in said primary micro-regions are canceled and in which a magnetization of said primary and secondary magnetic layers is not canceled, the magneto-optical disk reflecting a first amount of the laser beam and allowing a second amount of the laser beam to pass through; and
   converting one of the reflected first amount of the laser beam and the second amount of the laser beam to electric signals by optical processing.

* * * * *